(12) United States Patent
Dixon-Roche (10) Patent No.: US 6,505,649 B1
(45) Date of Patent: Jan. 14, 2003

(54) HOSES OR FLEXIBLE PIPES (76) Inventor: Keith Dixon-Roche, 215 Old Dover Road, Canterbury, Kent CT13ER (GB)

( * ) Notice: Subject to any disclaimer, the term of this patent is extended or adjusted under 35 U.S.C. 154(b) by 0 days.

(21) Appl. No.: 09/581,697

(22) PCT Filed: Dec. 7, 1998

(86) PCT No.: PCT/GB98/03650
§ 371 (c)(1),
(2), (4) Date: Jul. 15, 2000

(87) PCT Pub. No.: WO99/32820
PCT Pub. Date: Jul. 1, 1999

(30) Foreign Application Priority Data

Dec. 19, 1997 (GB) ............................................. 9726729
Mar. 14, 1998 (GB) ............................................. 9805374

(51) Int. Cl.[7] ................................................ F16L 11/00
(52) U.S. Cl. ................. 138/137; 138/140; 138/141; 138/125; 138/127
(58) Field of Search .................................. 138/125, 139, 138/127, DIG. 3, 124, 132, 133, 140, 141

(56) References Cited

U.S. PATENT DOCUMENTS

| 4,330,017 | A |   | 5/1982 | Satoh et al. | 138/126 |
|---|---|---|---|---|---|
| 4,931,326 | A | * | 6/1990 | Weil | 138/103 |
| 5,062,456 | A |   | 11/1991 | Cooke et al. | 138/125 |
| 6,334,466 | B1 | * | 1/2002 | Jani et al. | 138/126 |

FOREIGN PATENT DOCUMENTS

| EP | 0577005 | 6/1993 |
|---|---|---|
| EP | 0582302 | 8/1993 |
| JP | 2277633 | 11/1990 |

* cited by examiner

Primary Examiner—Patrick Brinson
(74) Attorney, Agent, or Firm—Thompson Coburn LLP (57) ABSTRACT

A hose or flexible pipe (100,200) which has an inner lining (116; 216) composed of fluoropolymer. This gives the hose an improved capacity to withstand high temperatures, chemical degradation and embrittlement along with flexibility and light weight. The hose wall structure (102) is preferably fully bonded to improve support for the fluoropolymer lining (116; 216). The fluoropolymer lining (116; 216) also makes practicable the use of rubbers having the ability to withstand high temperatures.

10 Claims, 10 Drawing Sheets

HOSES OR FLEXIBLE PIPES

This invention relates to hoses or flexible pipes, and relates more particularly but not exclusively to hoses or flexible pipes which are adapted to the transport of hydrocarbons.

As used in this specification, the terms "hose" and "flexible pipe" are mutually synonymous. A hose (or flexible pipe) is an elongate flexible tube suitable for the transport of fluids (liquids and/or gases), and which can adapt to different paths without permanent deformation, eg. to provide a fluid path between objects which are in relative movement, such as a floating tanker and a production platform anchored on the sea bed. Hydrocarbons produced by undersea wells are frequently chemically and physically aggressive, and hence liable to cause unacceptable damage to transport hoses. Hoses usually require end fittings by which the hose ends may be mechanically anchored and also secured in a fluid-tight manner to a source or receiver of the fluid to be transported by the hose. Such end fittings require to be reliably sealed to the hose both to withstand pressure and to withstand degradation by the fluid transported by the hose.

According to a first aspect of the present invention there is provided a hose or flexible pipe characterised in that the hose or flexible pipe is internally lined with an internal lining comprising a fluoropolymer.

The hose or flexible pipe is preferably formed such that the wall of the hose or flexible pipe is a bonded structure at least in the part of the wall contacted by the internal lining. The wall of the hose or flexible pipe is preferably a fully bonded structure.

The fluoropolymer of the internal lining is preferably at least one fluoropolymer selected from the group of fluoropolymers comprising ETFE (ethyl-tetra-fluoro-ethylene), FEP (fluorinated ethylene propylene), HFP (hexa-fluoro-propylene), and PFA (per-fluoro-alkozyl).

The hose or flexible pipe may comprise reinforcement means which is preferably embedded in the wall of the hose or flexible pipe. The reinforcement means preferably comprises at least one reinforcement selected from the group of reinforcements comprising at least two layers of steel wire helically wound around and along the hose or flexible pipe, or at least one layer of synthetic polymeric textile material which may comprise aramid fibres. The reinforcement means may be embedded in an elastomer which may comprise silicone rubber, the elastomer preferably being reinforced by embedded yarn.

The internal lining of the hose or flexible pipe may itself be internally lined with an collapse-resistant liner which may be in the form of a self-interlocking spiral of steel strip.

According to a second aspect of the present invention there is provided a pressure-actuated seal for sealing the interface between an end fitting mounted on and secured to an end of a hose or flexible pipe and the internal lining of the hose or flexible pipe, characterised in that the seal comprises at least one cavity in the end fitting, the or each said cavity being contiguous with the interface, and in that a respective mass of polymeric material is located in the or each said cavity to be adjacent the interface, wherein the or each said cavity communicates with the bore of the hose or flexible pipe to transfer the pressure of fluid in the bore of the hose or flexible pipe to the respective mass of polymeric material such as to urge the respective mass of polymeric material against the portion of internal lining defining that part of the interface with which the respective cavity is contiguous.

The seal may comprise discrete communication means for communicating the or each said cavity with the bore of the hose or flexible pipe. The discrete communication means may comprise fluid passage means, and where there are a plurality of cavities in the end fitting, the fluid passage means may lead from a given cavity either directly to the bore of the hose or flexible pipe, or indirectly by way of another cavity which itself is directly or indirectly communicated with the bore of the hose or flexible pipe by way of a further fluid passage means.

At least one cavity in the end fitting may extend circumferentially around the fitting, and the respective mass of polymeric material located in said circumferentially extended cavity may be generally toroidal. The or each generally toroidal mass of polymeric material may incorporate a respective reinforcing member which is itself generally toroidaly and preferably embedded in the respective mass of polymeric material.

The polymeric material of the seal means is preferably a fluoropolymer which may be a fluoropolymer selected from the group of polymers comprising ETFE (ethyl-tetra-fluoro-ethylene), PTFE (poly-tetra-fluoro-ethylene), FEP (fluorinated ethylene propylene), HFP (hexa-fluoro-propylene) and PFA (per-fluoro-alkozyl), or a mixture of two or more fluoropolymers selected from said group of fluoropolymers.

In the seal means, the or each said mass of polymeric material may be associated with a respective non-polymeric member disposed between at least the greater part of the respective mass and the inlet or inlets to the respective cavity of the fluid passage means. The or each said non-polymeric member may be formed of sheet metal and be present in or on the respective mass of polymeric material at least in the portion or portions thereof adjacent said inlet or inlets.

Embodiments of the invention will now be described by way of example, with reference to the accompanying drawings wherein.

Figure 1:
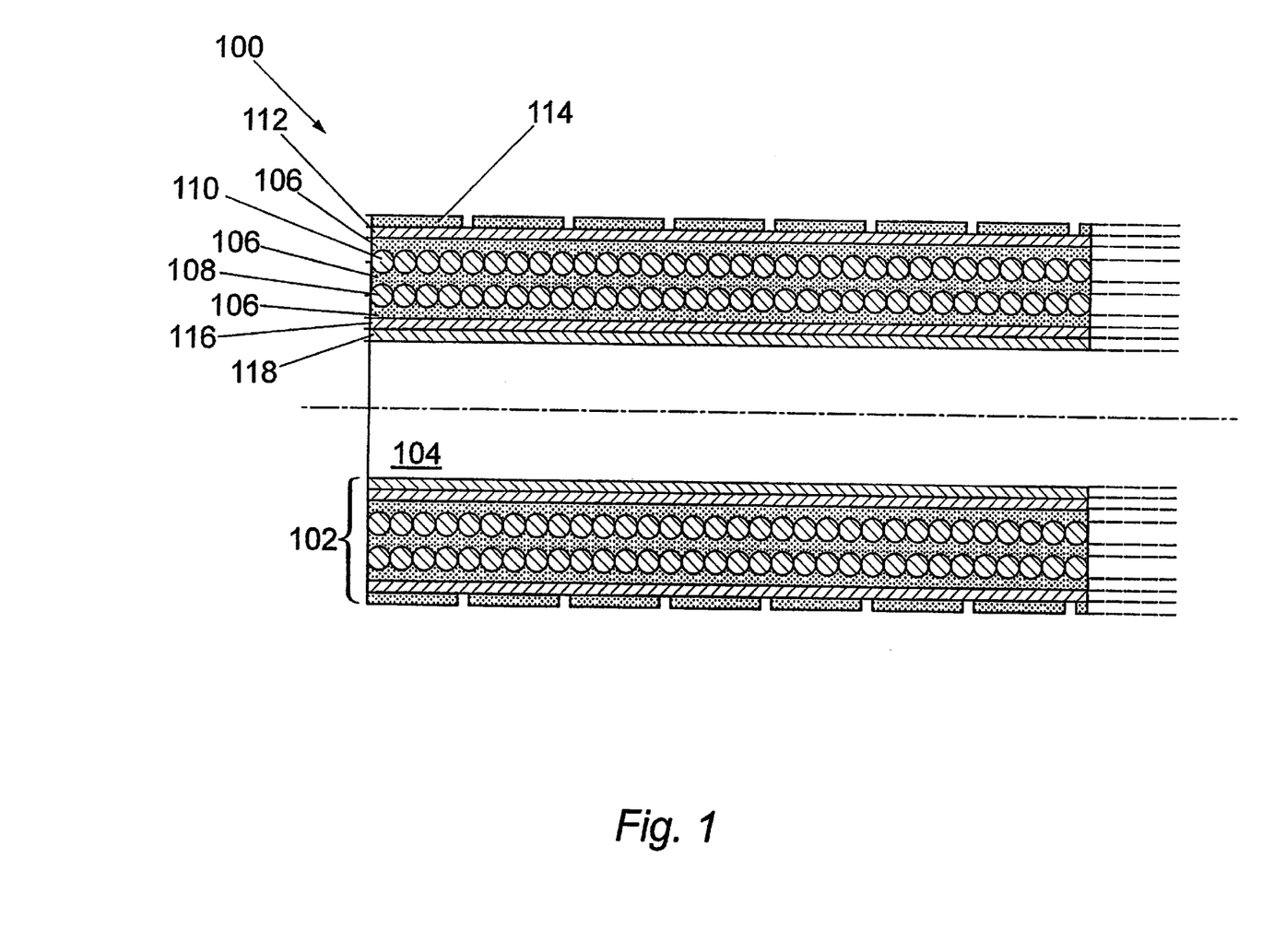
FIG. 1 is a longitudinal diametral section of a first embodiment of hose.

Referring first to FIG. 1, a first embodiment of hose in accordance with the invention is represented by a hose 100 having a tubular wall 102 surrounding a bore 104. The structure of the hose wall 102 is fully bonded and comprises a layer 106 of silicone rubber incorporating yarn as a reinforcement. Embedded in the rubber layer 106 are two layers 108 and 110 of reinforcement, each reinforcement layer 108, 110 comprising a respective steel wire spirally wound around and along the hose 100.

The hose 100 is sheathed in an outer layer 112 of rubber, such as chloroprene or Hypalon. The hose 100 optionally has an outer cover 114 of shrink-fitted plastics which is perforated to release gases permeating through the hose wall 102 from the bore 104.

The hose 100 is internally lined with an internal lining 116 composed of a suitable fluoropolymer, such as ETFE (ethyl-tetra-fluoro-ethylene), FEP (fluorinated ethylene propylene), HFP (hexa-fluoro-propylene), or PFA (per-fluoro-alkozyl). The lining 116 may be composed of other suitable fluoropolymers, or a mixture of two or more fluoropolymers.

The internal lining 116 is optionally lined with an abrasion-resistant layer or barrier 118 of any suitable material, for example a self-interlocking spiral of steel strip.

Various advantages arise from the use of a fluoropolymer as an internal lining material for a hydrocarbon transport hose:

(a) unlike other plastics, fluoropolymers do not blister due to gas-induced explosive decomposition;

(b) unlike other plastics, fluoropolymers do not require plasticisers which may be leached out by hot dry gases transported through the hose to leave the lining embrittled. As a hose-lining material, fluoropolymers are typically ten times more flexible than the rubbers previously employed as hose-lining materials;

(c) fluoropolymers are highly impermeable to gas, typically having one-tenth of the gas permeability of the rubbers previously employed as hose-lining materials;

(d) as hose-lining materials, fluoropolymers can be utilised at much higher temperatures than other plastics;

(e) fluoropolymers are the flexible materials most chemically resistant to crude oil and associated gases while being practicable for large-scale use.

Figure 2:
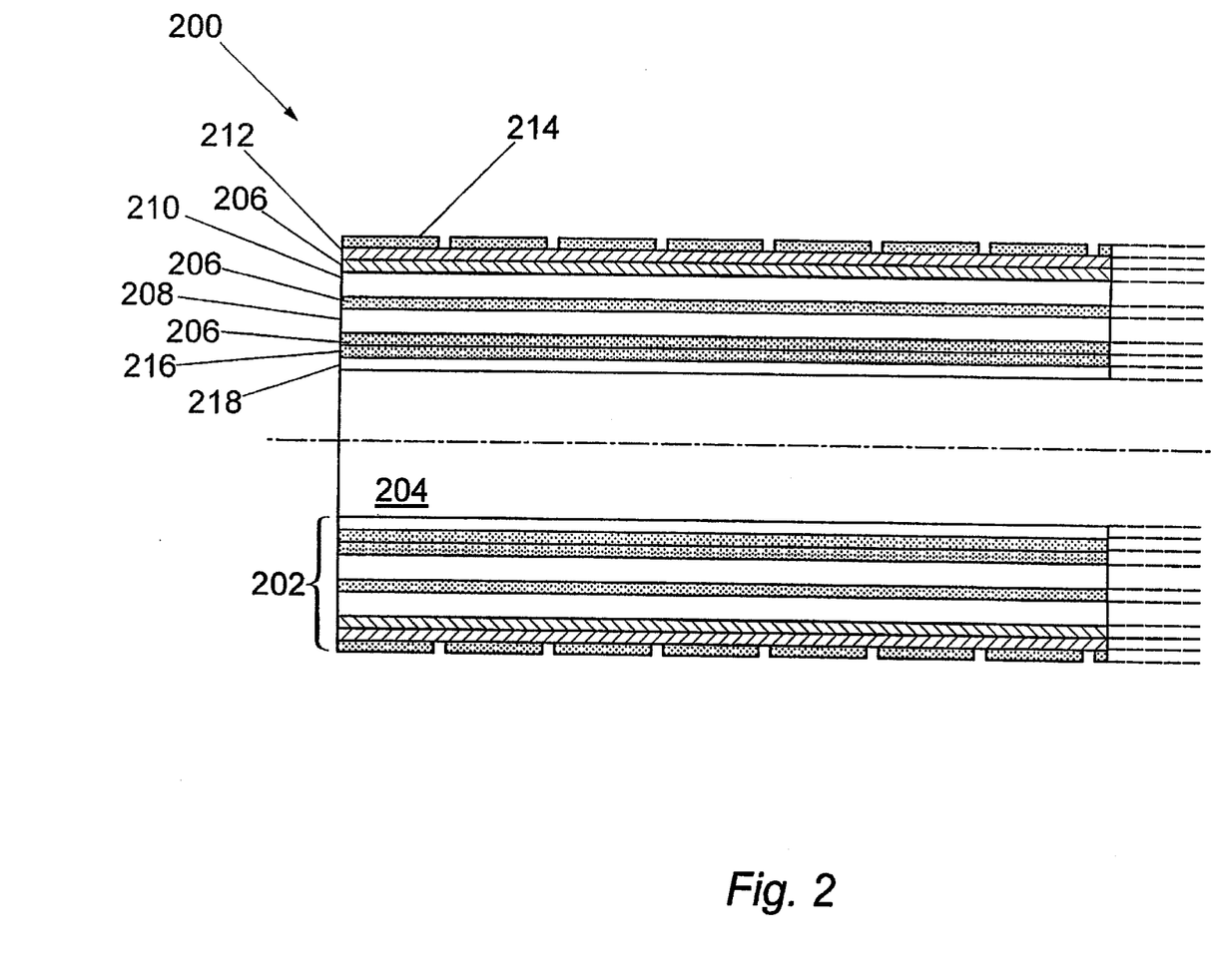
FIG. 2 is a longitudinal diametral section of a second embodiment of hose.

Referring now to FIG. 2, this illustrates a second embodiment of hose in accordance with the invention, comprising a hose 200 having a tubular wall 202 surrounding a bore 204. The structure of the hose wall 202 is generally similar to the structure of the hose wall 102 previously described in respect of the first embodiment of hose 100, namely yarn-reinforced rubber 206 externally sheathed in a rubber layer 112 with an optional outer layer 214 of perforated plastics, an internal lining 216 of fluoropolymer which may be the same fluoropolymer (or mix of fluoropolymers) as utilised for the internal lining 116 of the first embodiment 100, and an optional innermost abrasion-resistant lining 218 of self-interlocking spiral metal strip.

The second embodiment of hose 200 differs from the first embodiment of hose 100 in that the layers 108 and 110 of spirally-wound steel wire reinforcement are replaced by respective layers 208 and 210 of aramid textile embedded on the rubber 206 to serve as a two-layer reinforcement of the hose 200.

In the second form of hose 200, the fluoropolymer inner lining 216 serves the same function as the fluoropolymer lining 116 in the first form of hose 100, with the same advantages.

In both the first and second forms of hose 100 and 200, their fully bonded wall structures have the advantage of providing continuous support for the fluoropolymer inner lining, since fluoropolymers tend to cold flow under pressure and therefore non-bonded hose wall structures cause difficulty in providing adequate support for fluoropolymer linings. If it is necessary or desirable for at least part of the wall structure of a hose in accordance with the invention to be non-bonded, then at least those parts of the wall structure adjacent the inner lining should nevertheless be bonded or otherwise formed to provide substantially continuous support for the fluoropolymer lining. Fully bonded hoses and flexible pipes are preferred since bonded hoses and flexible pipes are generally cheaper to manufacture, lighter in weight per unit length, and more flexible than non-bonded hoses and flexible pipes.

The use of heat-resistant fluoropolymers as inner linings in bonded hoses and flexible pipes permits the use in the bonded hose walls of rubbers which are resistant to high temperatures to match the higher temperature resistance of fluoropolymers, specifically rubbers which are more heat resistant than materials previously used in hoses (wherein the use of rubber which was resistant to high temperature was irrelevant and unnecessarily expensive in the absence of a matching heat resistance for whatever lining material was employed). Thus bonded hoses with fluoropolymer linings in accordance with the invention can transport fluids containing gases at high temperature and high pressure but without the risk of delamination or degradation inherent in prior art hoses. In particular, a bonded hose with fluoropolymer lining can withstand up to 200° C. (which is 70° C. hotter than any prior art hose can withstand for an indefinite time), while being considerably lighter and more flexible than prior art hoses.

Figure 3:
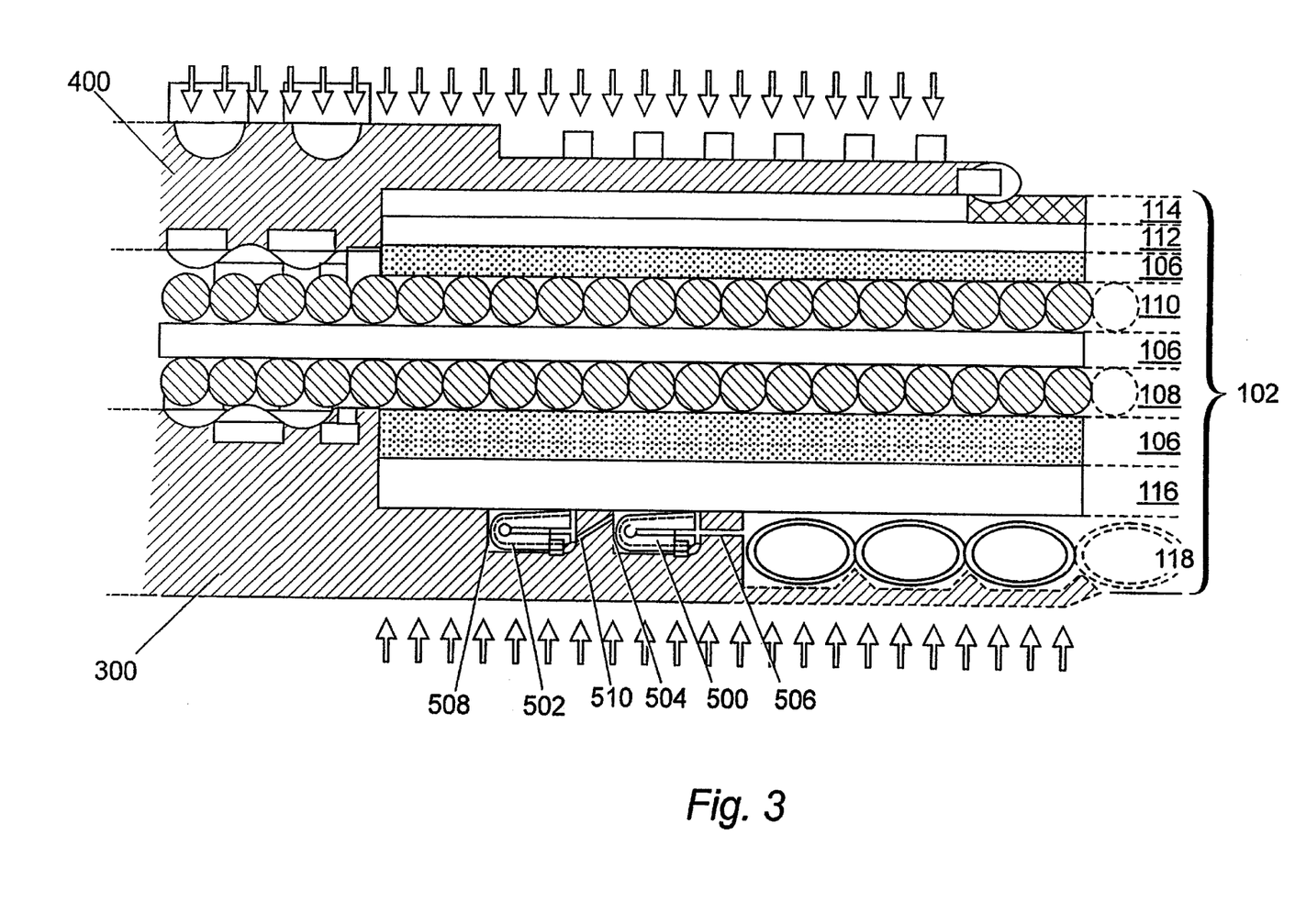
FIG. 3 is a fragmentary longitudinal diametral section, to a much-enlarged scale, of part of the end of the first embodiment of hose which is in the process of having an end fitting secured and sealed thereto.

Referring now to FIG. 3, this illustrates in diametral longitudinal section and to a much-enlarged scale, part of the end of the hose 100 (equivalent to the upper left corner of FIG. 1) and parts 300 and 400 of an end fitting about to be secured to the end of the hose 100. The end fitting is initially in two parts, namely a suitably profiled inner sleeve 300 and a suitably profiled outer sleeve 400 which are placed respectively inside and outside the hose end (as depicted in FIG. 3) so as partly to penetrate/overlie the hose end, with portions of each fitting part (leftwards of the portions shown in FIG. 3 and not themselves shown in FIG. 3) remaining beyond the end of the hose 100. (End fittings which are similar but not identical are shown more completely in FIGS. 6 and 9 to which reference may be made to comprehend the context of FIG. 3).

To assist in proper attachment of the end fitting, certain layers of the hose wall 102 are cut back as shown in FIG. 3. The outer plastics cover 114 is substantially completely removed from the portion of the hose end which is to lie within the end fitting, and the abrasion-resistant self-interlocked spiral 118 is cut back for about half the distance by which the hose end will penetrate the end fitting. Of the essential bonded structure of the hose wall 102, the rubber sheath 112, the fluoropolymer lining 116, and portions of the rubber layer 106 radially inside the reinforcement layer 108 and radially outside the reinforcement layer 110 are stripped for about one-quarter of the depth of penetration of the hose into the end fitting. This leaves the reinforcement layers 108 and 110, together with as much of the rubber 106 as was sandwiched between the layers 108 and 110, not cut away (save for possible preliminary tidying of the very end of the hose to remove any excessive raggedness).

When the sleeves 300 and 400 are suitably located on the pre-trimmed end of the hose 100 as shown in FIG. 3, the sleeve portions sandwiching the hose end are swaged onto the hose end so as to compress and permanently entrap the hose, the rightward end of the inner fitting part 300 being radially expanded and the rightward end of the outer fitting part 400 being radially compressed. When swaging is complete, the sleeves 300 and 400 are welded together at points remote from the hose 100, or otherwise suitably mutually secured, and thereby formed (together with any other necessary fitting parts) into a unitary end fitting by which the hose 100 can be mechanically anchored and coupled in a fluid-tight manner to a source or receiver of fluids to be transported by the hose.

Although end fittings which are swaged onto conventional hoses are usually adequately leak tight, the more extreme conditions under which hoses of the present invention are utilised present additional problems of sealing, aggravated by the tendency of the fluoropolymer inner lining to cold flow. To counteract such problems, and to ensure reliable sealing between the hose and its end fitting, the arrangement shown in FIG. 3 incorporates a pair of active seals which will now be described in detail.

Referring again to FIG. 3, the sealing of the end fitting 300 and 400 to the hose 100 is based upon a primary active seal 500 and a secondary active seal 502. The primary and secondary seals 500 and 502 have mutually identical structures of a generally toroidal shape, but operate under different conditions (as will be detailed subsequently). Details of an individual one of the seals 500 and 502 will be given below with reference to FIGS. 4 and 5.

The primary active seal 500 is lodged in a cavity 504 having the form of a circumferential groove machined into the periphery of the inner end fitting part 300 where that part will form an interface with the hose in the fully assembled end fitting. The cavity or groove 504 has a width in the longitudinal direction of the fitting part 300 (horizontally in FIG. 3) which is slightly greater than the overall axial length of the seal 500. The groove 504 has a depth in the radial direction of the fitting part 300 (vertically in FIG. 3) which is somewhat less than the radial dimension of the seal 500 in its relaxed condition (ie radial extent from inner to outer faces in the absence of external forces), but marginally greater than the radial dimension of the seal 500 in its bound condition (ie radial extent from inner to outer faces when radially compressed just sufficiently to collapse an internal gap which will subsequently be detailed with reference to FIGS. 4 and 5). Thus the cavity 504, when bound by the adjacent portion of the lining 116 with which the fitting part 300 and the cavity 504 form an interface, holds the seal 500 in a condition in which it is neither radially relaxed nor radially closed up.

The cavity 504 is linked by three spaced-apart drillings 506 (only one of which is visible in FIG. 3) to the vicinity of the anti-abrasion lining 118 and thence to the fluid in the hose bore 104 by way of the inter-turn gaps in the spiral strip layer 118. Thus the cavity 504 and at one side of the seal 500 (the right side of the cavity 504 as viewed in FIG. 3) is exposed to whatever pressure prevails in the hose bore 104.

The secondary active seal 502 (which is structurally and dimensionally identical to the seal 500) is lodged in a cavity 508 in the form of a circumferential groove which is dimensionally identical to the cavity or groove 508, the cavity 508 being also formed in the periphery of the inner part 300 of the end fitting but axially further away from the end of the fitting which leads into the hose bore 104. The cavity 508 is linked at one side (the right side as viewed in FIG. 3) by three spaced-apart drillings 510 (only one of which is visible in FIG. 3) to one side of the cavity 504 (the left side as viewed in FIG. 3) at locations which are each separated by the seal 500 from the inlets to the cavity 504 from the drillings 506 (these inlets being at the right side of the cavity 504 as viewed in FIG. 3). Thus, whereas one side of the primary active seal 500 (the right side as viewed in FIG. 3) is exposed to the full pressure in the hose bore 104, the corresponding side of the secondary active seal 502 (also the right side as viewed in FIG. 3) is exposed only to the pressure of whatever leaks past the seal 500. This difference in types of pressure to which the seals 500 and 502 are respectively exposed gives rise to their functional differences, as denoted by the terms "primary" and "secondary" respectively. The term "active" also applied to both seals 500 and 502 arises from structure of these seals which causes the outer half of each seal to tend to expand radially outwards when exposed to a pressure differential axially across the seal, as will now be described in detail with reference to FIGS. 4 and 5.

Figures 4, 5:
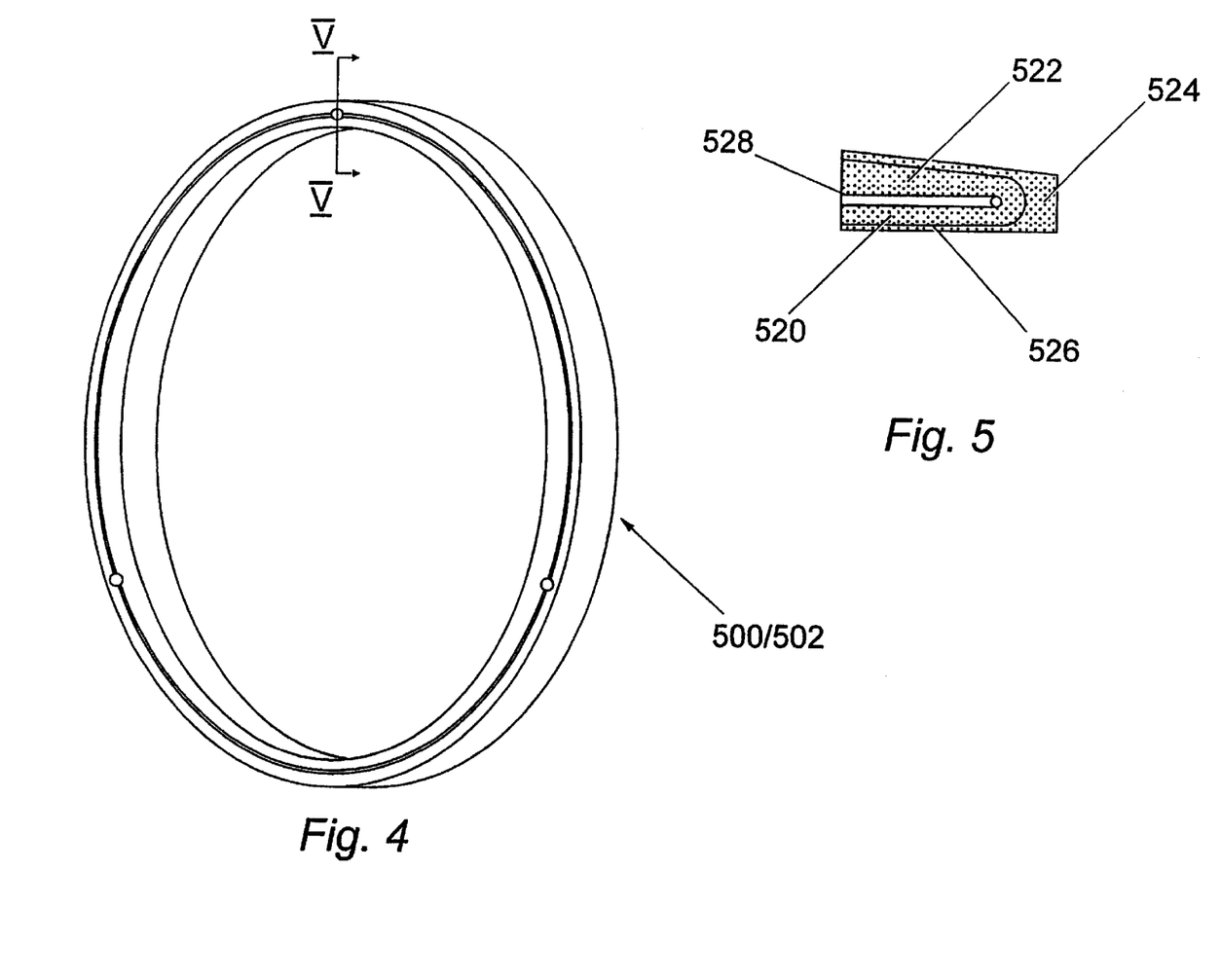
FIG. 4 is a perspective view of a seal forming part of the arrangement illustrated in FIG. 3.
FIG. 5 is a transverse cross-section of the seal illustrated in FIG. 4.

FIG. 4 is a perspective view of a complete one of the seals 500 or 502, while FIG. 5 is a transverse cross-section of the seal 500 (or 502) taken on the line V—V in FIG. 4 and presented to an enlarged scale with respect to the scale of FIG. 4. The seal 500 is generally toroidal (FIG. 4) with a cross-section which is externally a near-rectangular trapezoid (FIG. 5) when relaxed (i.e. free of external forces). Most significantly, the seal 500 has a cross-section which is approximately U-shaped, having a longitudinally extending inner part 520, and a longitudinally extending outer part 522, these parts 520 and 522 being mutually coupled at one axial end of the seal by a radially extending part 524. The parts 520, 522, and 524 are not mutually distinct since the seal 500 is integrally formed, and reference is made to different parts of the seal only to facilitate the functional description which follows.

The seal 500 contains a U-shaped titanium strip 526 (FIG. 5) around which a fluoropolymer is moulded, except for a slot 528 extending along the centre of the U-shaped strip 526. The slot 528 is open to one end face of the seal 500 (the left end as shown in FIG. 5 and the right end as shown in FIG. 3), and thereby defines the three seal parts 520, 522, and 524.

Reverting to FIG. 3, the seals 500 and 502 are placed in their respective cavities or grooves 504 and 508 prior to the inner sleeve 300 of the end fitting being offered up to the end of the hose 100. When the end fitting is assembled and swaged on the end of the hose, with the seals 500 and 502 in place as indicated in FIG. 3, and the hose bore 104 is pressurised with a fluid to be transported through the hose 100, the fluid passes through the interstices of the spiral strip winding constituting the layer 118 and through the drillings 506 to pressurise the right side (as viewed in FIG. 3) of the cavity 504. Because the seal 500 is located in the cavity 504 with the open end of its slot 528 in the right side of the cavity 504, the pressurisation of right side of the cavity 504 and the consequent pressurisation of the slot 528 tends to open up to the seal 500, i.e. to cause the seal's outer part 524 to tend to expand radially outwards and into firmer contact with the inner lining 116 of the hose 100. (The inner part 520 of the seal 500 is constrained from moving radially inwards by the underlying body of the sleeve 300). The seal 500 is thereby pressure-actuated, i.e. its sealing effect is augmented from whatever sealing is effected in the absence of pressure differentials, to some higher level of sealing which level is a function of the pressure to be sealed.

To the extent that imperfections of sealing permit fluid to pass the primary seal 500, such leakage into the left side of the cavity 504 (as viewed in FIG. 3) will transfer an increase in pressurisation via the drillings 510 to the right side of the secondary seal 502, and thereby cause pressure-actuation of the seal 502 to bring it into effect as a backup to the primary seal 500. The structure and function of the secondary seal 502 are the same as for the primary seal 500, with the only substantive differences between these seals being in their respective locations and sources of pressurisation.

Figure 6:
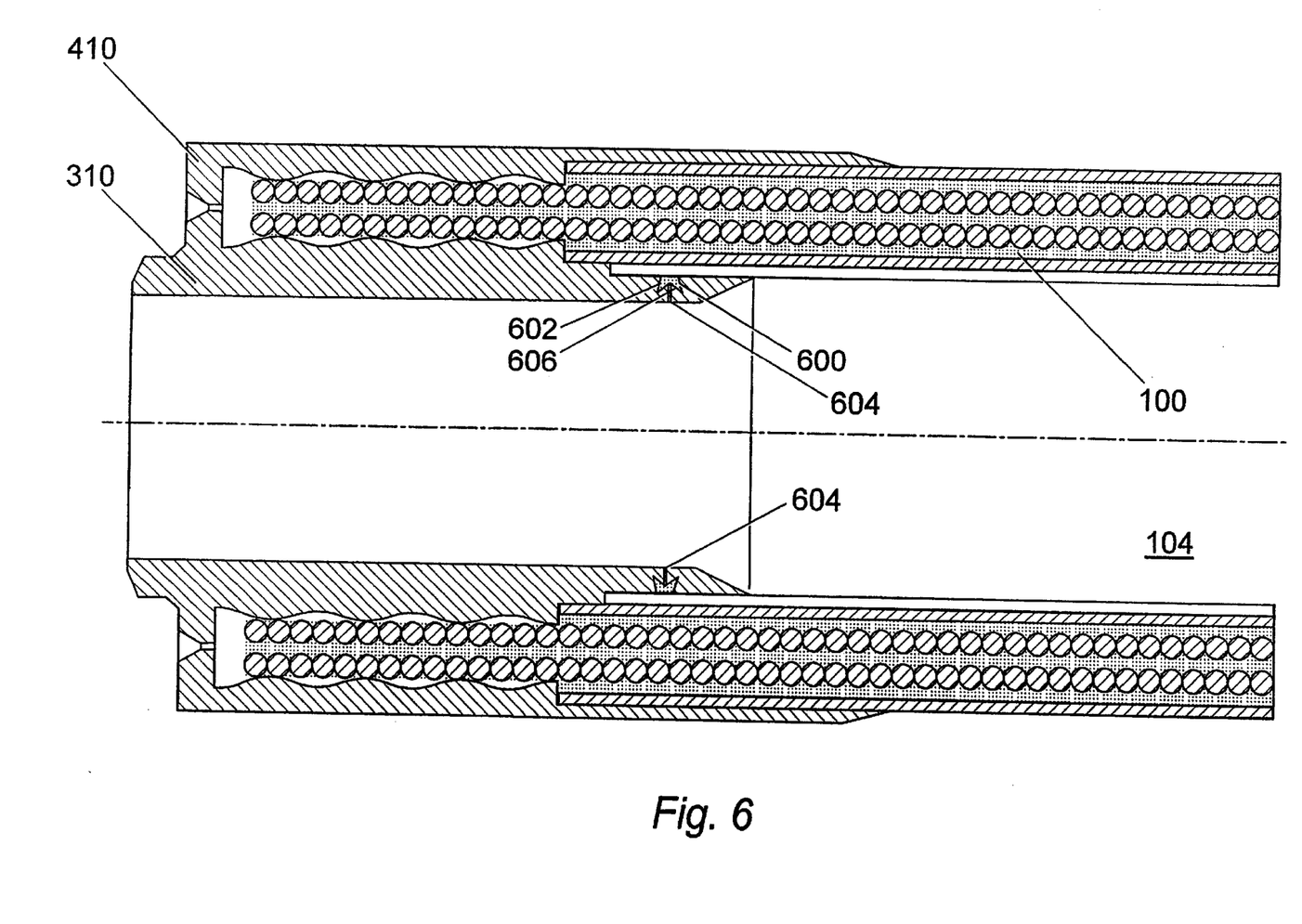
FIG. 6 is a longitudinal diametral section of a second arrangement of hose end, and fitting, and seal.

FIG. 6 shows another arrangement of hose end, end fitting, and active seal, this other arrangement being similar in principle to the arrangement of FIG. 3, but different in detail. As with the previous end fitting, in the arrangement of FIG. 6, the end fitting is initially in two parts, namely a suitable profiled inner sleeve 310 and a suitably profiled outer sleeve 410 which are placed respectively inside and outside the end of the hose 100. In the FIG. 6 arrangement, the inner sleeve 310 is sealed to the inner lining 116 of the hose 100 by an active seal 600 of generally toroidal form. The seal 600 is formed from a fluoropolymer of suitable properties and may be one of the fluoropolymers from which the inner lining 116 is selected, or a mixture of such fluoropolymers. The seal 600 is located in a cavity having the form of a circumferential groove 602 in the peripheral face of the inner sleeve 310. Because the cavity or groove 602 is cut inwards from the periphery of the sleeve 310 at a portion of the sleeve 310 which is inside the hose bore 104 and in contact with the inner lining 116, the cavity 602 is contiguous with the interface between the inner lining 116 and the inner sleeve 310 of the end fitting. The cross-section of the cavity 602 is tapered towards the mouth of the cavity from a bi-angularly convex radially inner surface, somewhat resembling a tip-truncated arrow head. Several spaced-apart passages 604 extend from the radially inner surface of the cavity 602 radially inwards through the body of the inner sleeve so as to communicate the cavity 602 radially inwards of the seal 600 with the continuation of the hose bore 104 through the end fitting. The centre of the bi-angularly convex floor is capped by a circumferentially expandable toroidal strip 606 of metal which serves to transmit fluid pressure (arriving by way of the passages 604 from the hose bore 104) to the radially inner side of the seal 600, and thereby pressure-actuate the seal 600 radially outwards into sealing contact with the inner lining 116 of the hose 100.

A preferred method of forming the seal 600 will now be described with reference to FIGS. 7 and 8.

Figure 7:
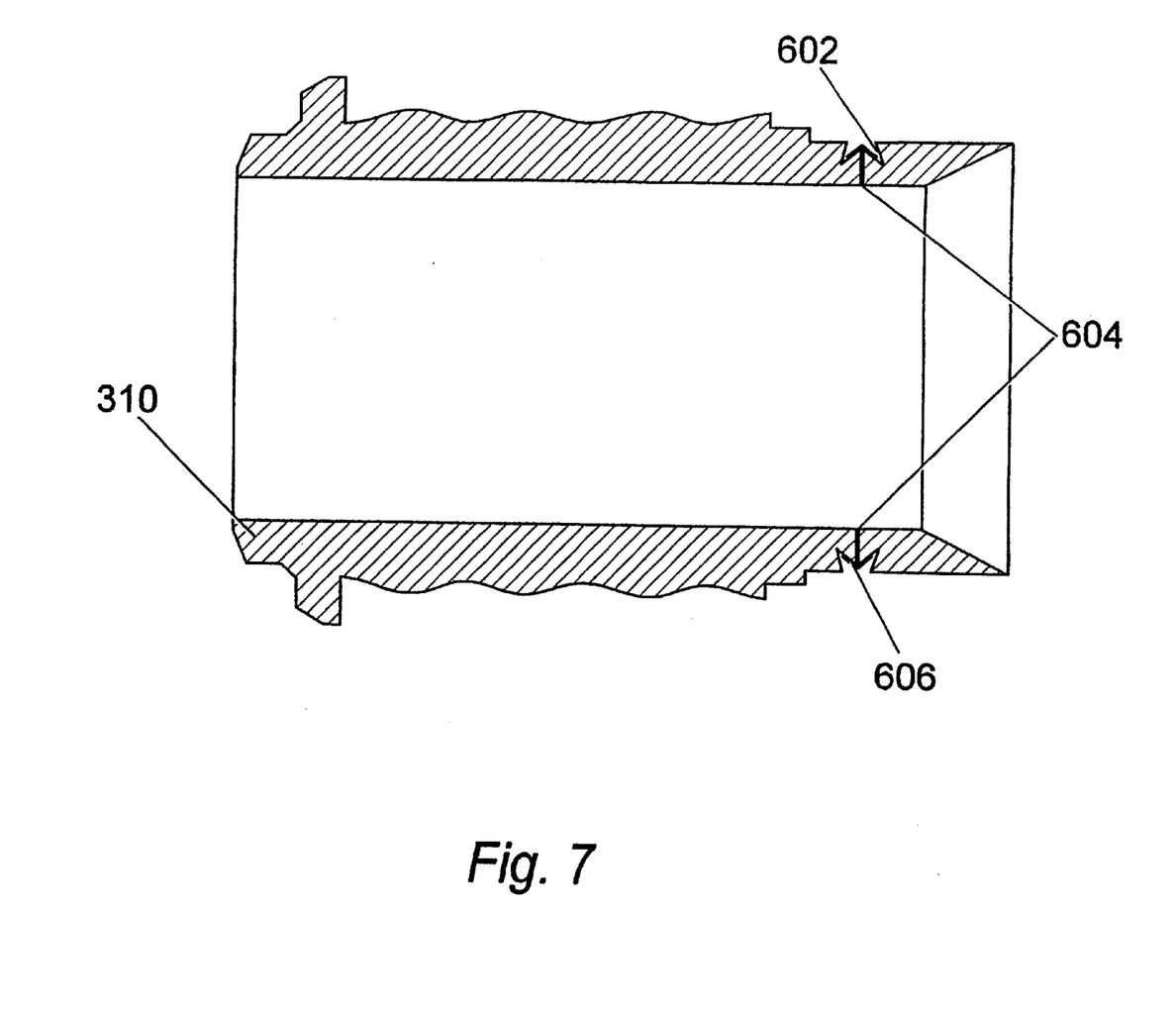
FIG. 7 is a longitudinal diametral section of an inner part of the end fitting of FIG. 6 being prepared to receive a seal.

FIG. 7 shows the first stage in forming the seal 600. The inner sleeve 310 of the end fitting is initially separate from the outer sleeve 410, and remote from the hose 100. The periphery of the sleeve 310 is formed with the circumferential cavity or groove 602, and the radial passages 604 are drilled or otherwise formed between the radially inner surface of the cavity 602 and the bore of the sleeve 310. The toroidal metal strip 606 is then fitted onto the radially inner surface of the cavity 602. The strip 606 may be formed as (for example) a spring steel ring with a single transverse slit so as to be circumferentially expandable sufficiently to fit over the periphery of the sleeve 310 and be slid along the sleeve until springing into the cavity 602. Such capacity of the strip 606 for circumferential expansion is also more than adequate for the pressure-actuated expansion of the seal 600 in the completed sealing arrangement.

FIG. 7 represents the preparatory stage for the second stage of forming the seal 600, which will now be described with reference to FIG. 8.

Figure 8:
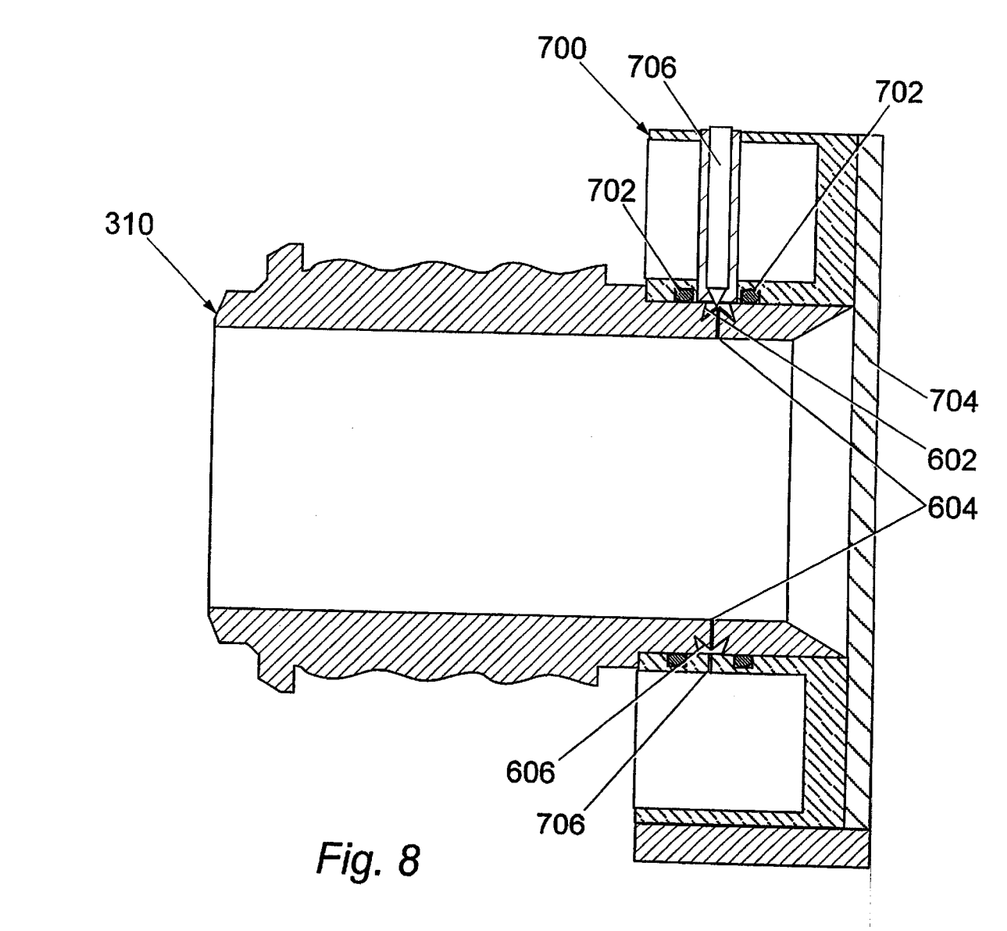
FIG. 8 is a view corresponding to FIG. 7 and illustrating the transfer moulding of the seal in the inner part of the end fitting.

In FIG. 8, the FIG. 7 arrangement is fitted with a ring mould 700 which is a close fit around the periphery of the inner sleeve 310 in the region of the sleeve periphery wherein the cavity or groove 602 is formed. The inner face of the mould 700 is sealed to the sleeve periphery on both axial sides of the cavity 602 by means of in-built metallic O-rings 702. The mould 700 is radially aligned on the sleeve 310 by the close fit of their inner and outer peripheries, respectively. The mould 700 is axially aligned on the sleeve 310 by means of an end plate 704 which abuts the end of the sleeve 310 when the mould 700 is at its correct axial location on the sleeve 310. Angular alignment of the mould 700 on the sleeve 310 is not essential, since the seal 600 eventually to be produced is circumferentially uniform.

The ring mould 700 incorporates an injection nozzle 706 by which molten fluoropolymer from a separate extruder (not shown) is injected into the cavity 602 so as to transfer mould the seal 600 in situ. Since the passages 604 are blocked against outflow from the cavity 602 by the capping of these passages with the strip 606, venting of gases and surplus polymer from the cavity 602 is allowed for by the provision of one or more suitably located sprue holes 706 through the inner face of the mould 700. When the injected fluoropolymer has coagulated to a sufficient extent, the mould 700 is removed from the sleeve 310 and unacceptable surface defects in the newly moulded seal 600 are rectified. Functioning of the seal 600 under pressure-actuation may be tested after curing but prior to installation of the sleeve 310 as part of an end fitting.

Figure 9:
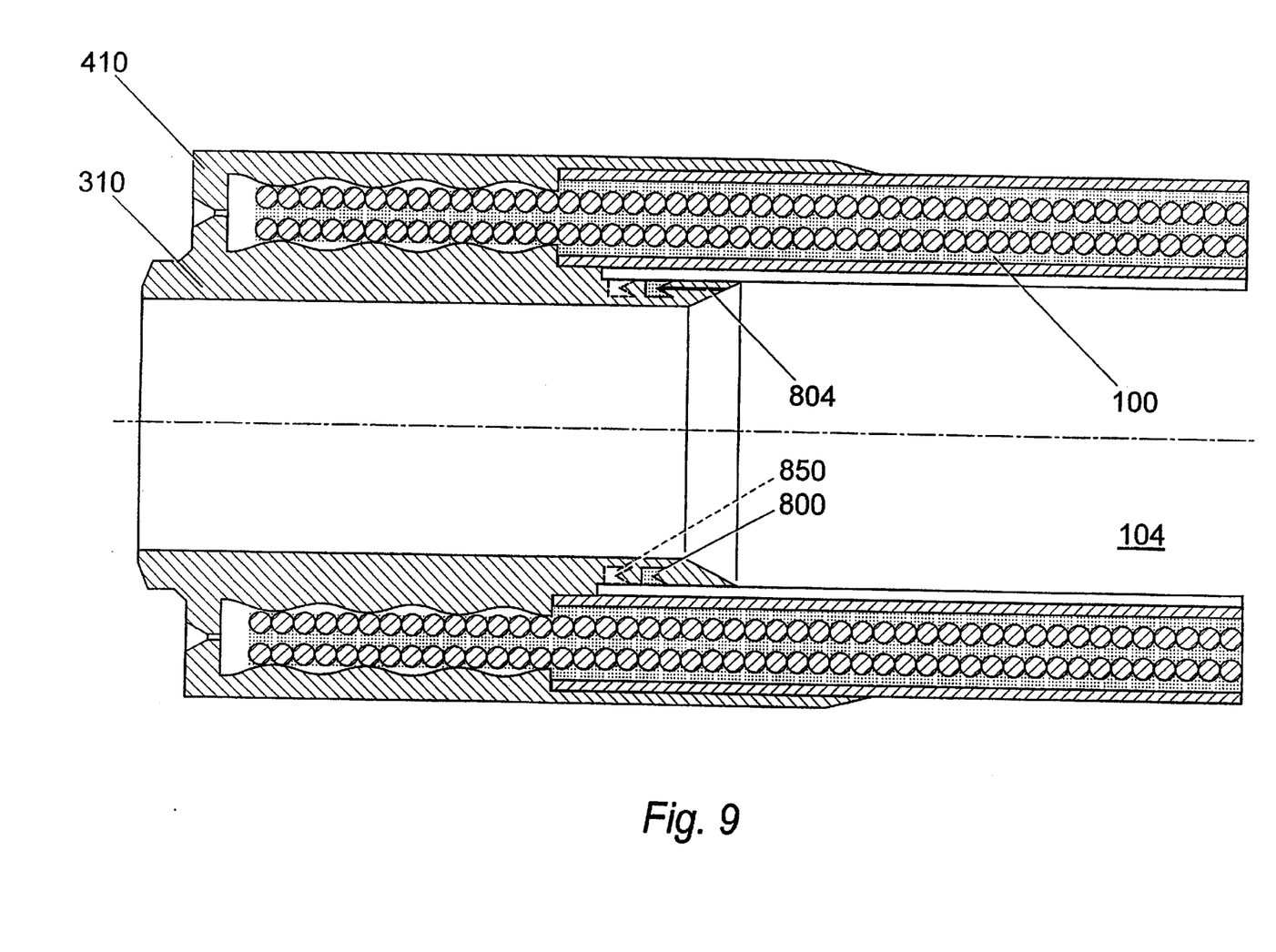
FIG. 9 is a longitudinal diametral section of a third arrangement of hose end, end fitting, and seal.

FIG. 9 shows a further arrangement of hose end, end fitting, and active seal, this further arrangement being essentially similar to the arrangement of FIG. 6, and differing principally in details of the active seal. Compared to the seal 600 in FIG. 6, the cross-section of the seal 800 in FIG. 9 is turned through 900 and the taper of the seal 600 is modified to parallelism in the seal 800. The bi-angularly convex bottom surface of the cavity 602 is now one side (the right side as viewed in FIG. 9) of the corresponding cavity 802, but the correspondingly angled strip 806 remains on this convex surface. Whereas in FIG. 6 the pressure transmitting fluid passages 604 extended radially, in FIG. 9 the corresponding pressure transmitting passages now extend axially in further accordance with the 900 transform of the cross-sectional structure of the seal 800 with respect of the cross-sectional structure of the seal 600.

Figure 10:
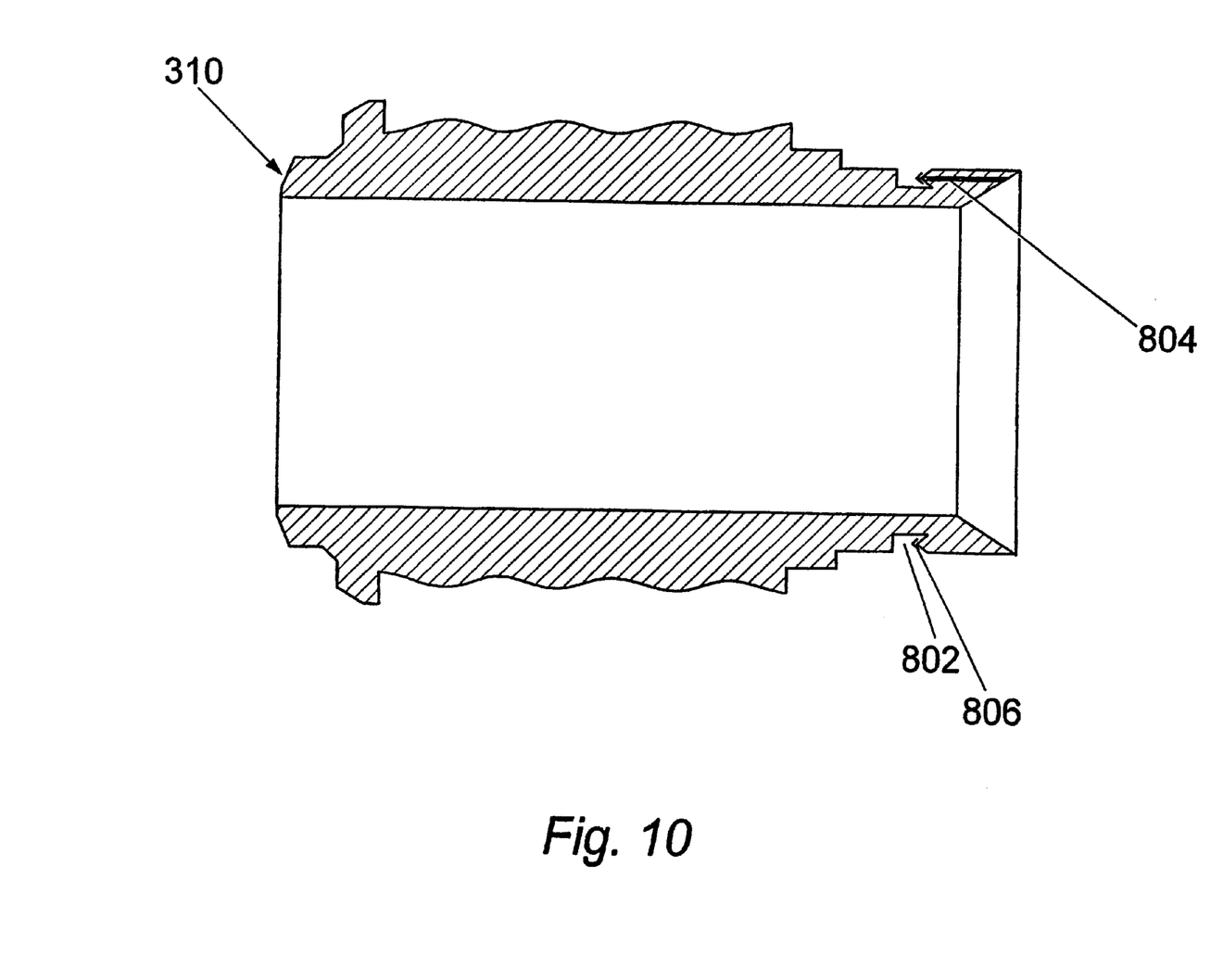
FIG. 10 is a longitudinal diametral section of an inner part of the end fitting of FIG. 9 being prepared to receive a seal.
Figure 11:
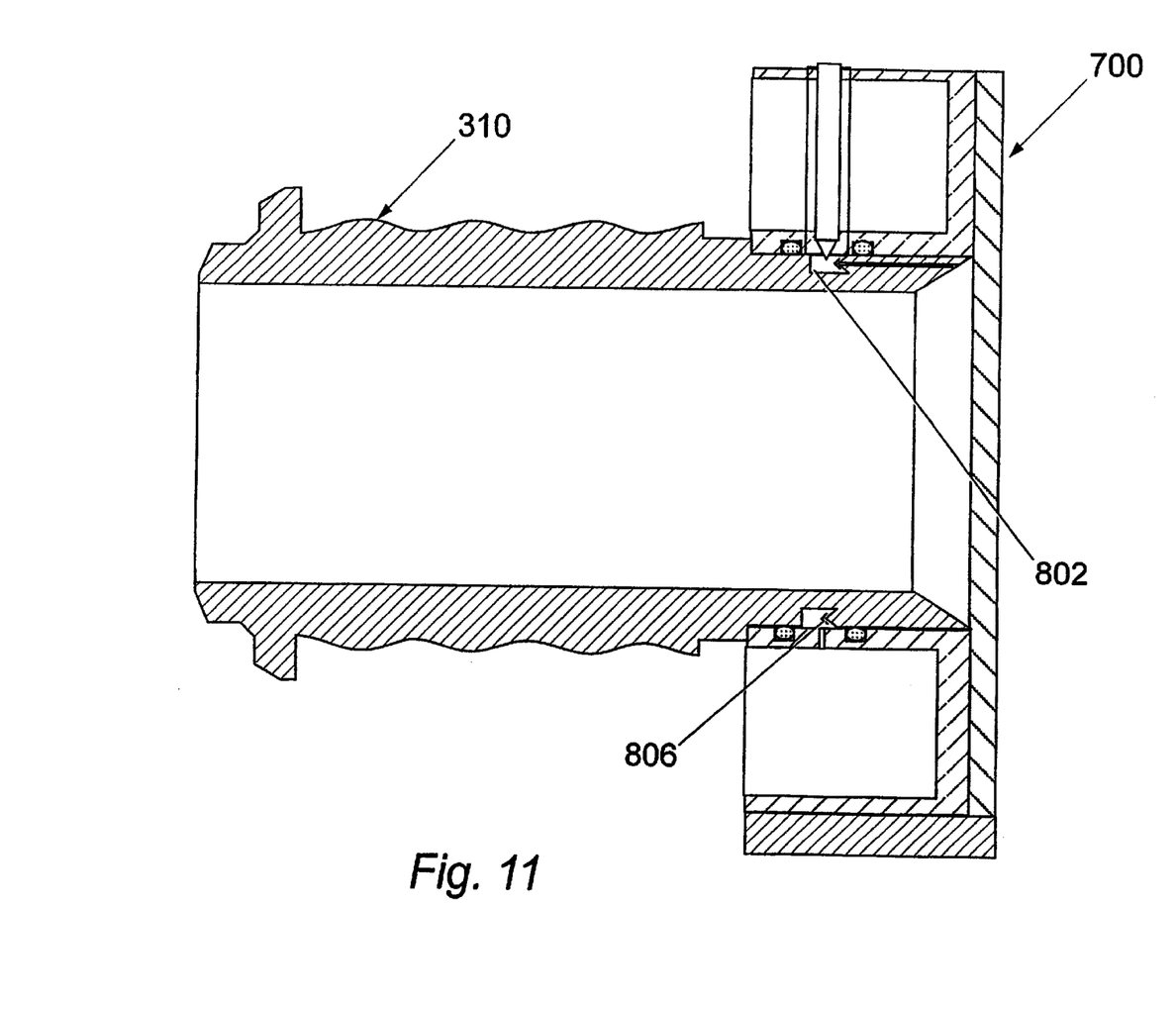
FIG. 11 is a view corresponding to FIG. 10 and illustrating the transfer moulding of the seal in the inner part of the end fitting.

FIGS. 10 and 11 show stages in the transfer moulding of the seal 800 which correspond exactly with FIGS. 7 and 8.

FIG. 9 also shows an optimal modification in which a secondary or backup seal 850 may be provided, with a respective pressure-transferring passage (not shown) leading into either the cavity 802 (such that the seal 850 is pressure-actuated by leakage past the seal 800) or directly to the bore of the sleeve 310 (such that rather than being a backup seal, the seal 850 is pressure-actuated in parallel with the seal 800 but seals in cascade).

Modification and variations of the above-described embodiments are possible without departing from the scope of the invention. For example, two or more seals could be provided in the FIG. 6 arrangement instead of the single seal shown. In any of the arrangements of FIG. 3, 6 or 9, the hose 100 (as detailed in FIG.1) could be substituted by the hose 200 (as detailed in FIG. 2) or by any other hose having a fluoropolymer lining in accordance with the invention. As already mentioned, the hose layers 114 and 118 in the hose 100 (and the corresponding layers 214 and 218 in the hose 200) are optional, and other modifications can be adopted such as (for example) providing a number of reinforcing layers (108, 110; 208; 210) greater or lesser than two or omitting discrete reinforcement layers altogether (and relying on the yarn reinforcements mixed in with the rubber of the layer 106 or 206). All forms of the pressure-actuated seal so far described with reference to the drawings have been toroidal and circumferentially continuous, but it is conceivable that additional or alternative seals may be required or desired for interface areas that are not complete rings, and as such, the pressure-actuated seals may be limited to discrete portions of the interface which portions are not ring-like, the shape of the sealing surface of the mass of seal material being appropriately re-shaped from the illustrated ring shapes.

Other modifications and variations of the above-described exemplary embodiments can be adopted without departing from the scope of the invention as defined in the appended claims.

What is claimed is:

1. A hose or flexible pipe comprising:

an internal lining comprising a fluoropolymer;

a wall surrounding and in contact with said internal lining;

said wall, at least in the part of said wall in contact with the internal lining, being a bonded structure formed of an elastomer; and reinforcement means surrounding the internal lining, said reinforcement means being fully embedded in and completely surrounded by said bonded structure.

2. A hose or flexible pipe as claimed in claim 1, in which said wall is a fully bonded structure.

3. A hose or flexible pipe as claimed in claim 1, in which the reinforcement means comprises at least two layers of steel wire helically wound around and along the hose or flexible pipe.

4. A hose or flexible pipe as claimed in claim 1, in which the reinforcement means comprises at least one layer of synthetic polymeric material.

5. A hose or flexible pipe as claimed in claim 4, in which the synthetic polymeric material comprises aramid fibres.

6. A hose or flexible pipe as claimed in claim 1, in which the fluoropolymer of the internal lining is at least one fluoropolymer selected from the group consisting of ETFE (ethyl-tetra-fluoro-ethylene), FEP (fluorinated ethylene propylene), HFP (hexa-fluoro-propylene) and PFA (per-fluoro-alkozyl).

7. A hose or flexible pipe as claimed in claim 1, in which the elastomer is a silicone rubber.

8. A hose or flexible pipe as claimed in claim 1, in which the elastomer is reinforced by embedded yarn.

9. A hose or flexible pipe comprising:

an internal lining comprising a fluoropolymer;

a wall surrounding and in contact with said internal lining;

said wall, at least in the part of said wall in contact with the internal lining, being a bonded structure formed of an elastomer;

reinforcement means surrounding the internal lining, said reinforcement means being fully embedded in and completely surrounded by said bonded structure;

and in which the internal lining of fluoropolymer is itself lined with a collapse-resistant lining.

10. A hose or flexible pipe according to claim 9, in which said collapse-resistant lining comprises a self-interlocking spiral of steel strip.

* * * * *